(No Model.)

J. S. BINKLEY.
COMPRESSOR FOR CORN SHOCK BINDERS.

No. 565,668. Patented Aug. 11, 1896.

Witnesses:
L. C. Hills
Wm. S. Van Loan

Inventor:
John S. Binkley,
by Franklin H. Hough
Attorney.

THE NORRIS PETERS CO., PHOTO-LITHO., WASHINGTON, D. C.

UNITED STATES PATENT OFFICE.

JOHN SILES BINKLEY, OF ATCHISON, KANSAS.

COMPRESSOR FOR CORN-SHOCK BINDERS.

SPECIFICATION forming part of Letters Patent No. 565,668, dated August 11, 1896.

Application filed March 31, 1896. Serial No. 585,627. (No model.)

*To all whom it may concern:*

Be it known that I, JOHN SILES BINKLEY, a citizen of the United States, residing at Atchison, in the county of Atchison and State of Kansas, have invented certain new and useful Improvements in Compressors for Corn-Shock Binders; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in compressors, and especially to a hand-portable shock-compressing device designed particularly to press cornfodder; and the invention resides in the provision of a suitable holder or rack to receive the fodder and an adjustable spring-actuated lever which is provided with a knife designed to cut the binding-twine after the knot has been tied, or before, the twine being passed through an aperture in the lever.

A further purpose of the invention resides in the provision of suitable upright portions of the rack having ratchet-teeth against which the free end of the spring-actuated compressor-lever is designed to engage and to be held at a given location while the knot is being tied, a spring being provided to hold a portion of the lever in one of the ratchet-teeth.

To these ends and to such others as the invention may pertain the same consists, further, in the novel construction, combination, and adaptation of the parts, as will be hereinafter more fully described, and then specifically defined in the appended claims.

I clearly illustrate my invention in the accompanying drawings, which, with the letters of reference marked thereon, form a part of this specification, and in which drawings similar letters of reference indicate like parts in both views, in which—

Figure 1:
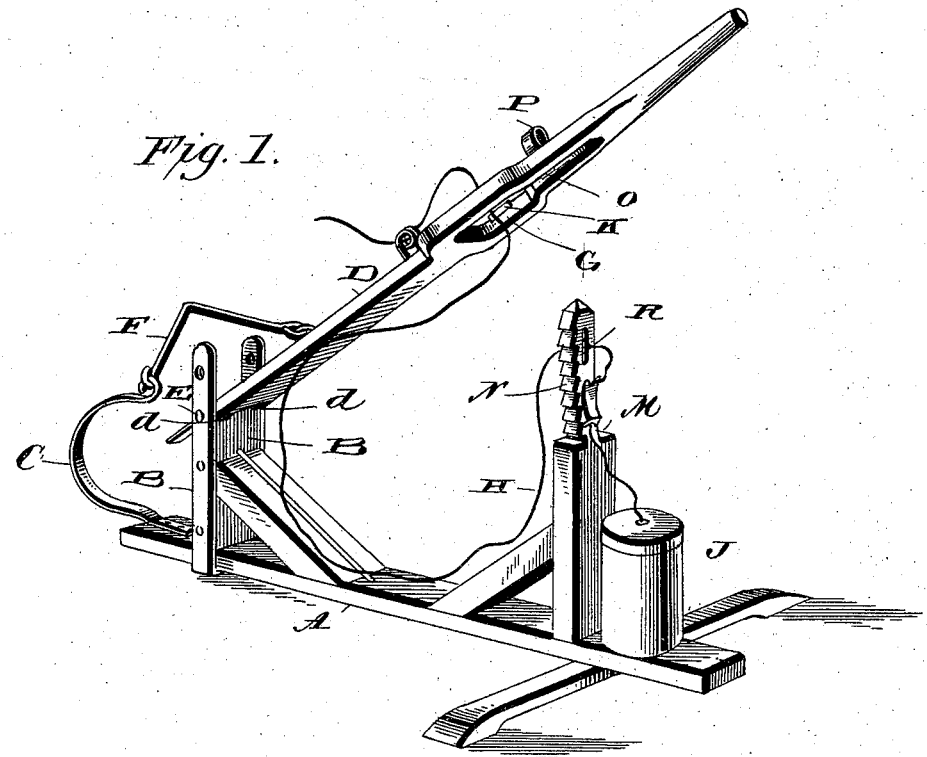
Figure 2:
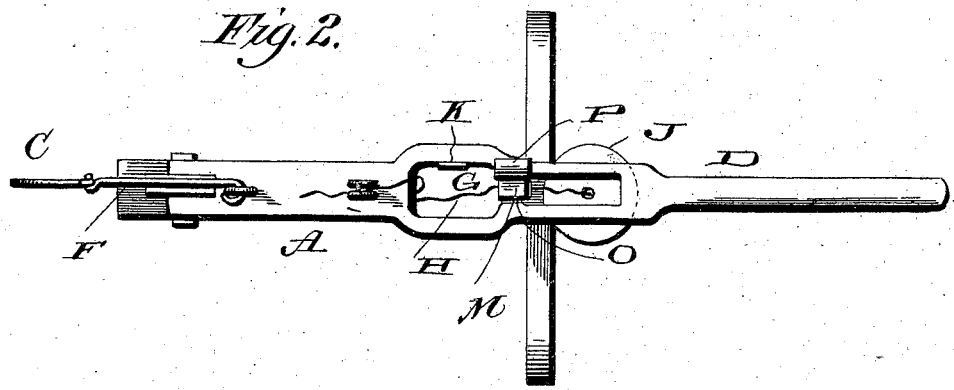

Figure 1 is a perspective view of my invention. Fig. 2 is a side elevation of the compressor-lever.

Reference now being had to the details of the drawings by letter, A designates the base portion of the device adapted to receive the fodder and mounted on suitable legs, and B are upright posts having a series of apertures in each post, which apertures are in registering lines. Secured to the rear end of the base portion A is one end of the spring-bar C, and D is the compressor-lever, having two projecting parts $d$ at one end, which are designed to engage under a rod E, placed through any two of the registering apertures, or it may be hinged permanently to a rod which is adjustable. The said spring-bar C is connected to the compressor-lever by the wire F, and the said lever is apertured at G, through which aperture the twine H is passed coming from the twine-box J. The aperture G is large enough so as to give sufficient space for an operator to tie a tight knot in the binding-cord within the aperture. On the inner circumference of this aperture G is secured the cutting edge K, on which the twine may be cut after or before the fodder is bound.

The post M has a series of ratchet-teeth on one side, as seen at N, and O is a projecting portion of the lever, which, when the lever is forced down over the ratchet-teeth on the post M, is designed to engage with the ratchet-teeth, a suitable spring P being provided to hold the lever to the ratchet-teeth.

From the foregoing it will be seen that when a bundle of the fodder is once bound the spring-bar will cause the compressor-lever to be raised after the lever is released from the ratchet-teeth.

An aperture R is made through the post M, through which the twine is passed and extended across the base of the device before the fodder is placed thereon.

It is my purpose to construct my improved portable binder so as to render it capable of being knocked down, so as to render it capable of being stored in as small space as possible.

Having thus described my invention, what I claim to be new, and desire to secure by Letters Patent, is—

1. A fodder-binder, consisting of the base, the vertical posts B and post M mounted thereon, combined with a compressor-lever having projecting parts $d$ at one end designed to engage with a rod carried in apertures between the posts B, the forward end of the lever perforated and designed to fit over the post M, and ratchet-teeth on the post M, a projecting portion O on said lever designed to engage therewith and a spring-bar attached or connected to the said lever at one end, and its other end to the base, substantially as shown and described.

2. A fodder-binder having in combination with the rack with the upright posts B, and M, the ratchet-teeth on the latter, a lever D having projecting parts $d$ at one end adapted to engage with an adjustable rod carried in apertures in the posts B, a spring-bar C, having one end connected to the base of the rack, its other end connected to the said lever, the cutting edge secured on the inner circumference of an aperture in the said lever, and a projecting portion of the lever adapted to engage with the said ratchet-teeth, and a twine carried in apertures in the post M and lever, all substantially as shown and described.

In testimony whereof I affix my signature in presence of two witnesses.

JOHN SILES BINKLEY.

Witnesses:
C. S. HULL,
J. P. ADAMS.